3,169,975
PRODUCTION OF SATURATED CYCLIC DICARBOXYLIC ANHYDRIDES

Alfred Schulz, Ludwigshafen (Rhine), Germany, assignor to Badische Anilin- & Soda-Fabrik Aktiengesellschaft, Ludwigshafen (Rhine), Germany
No Drawing. Filed June 4, 1963, Ser. No. 285,203
Claims priority, application Germany, June 6, 1962, B 67,573
4 Claims. (Cl. 260—346.3)

This invention relates to a new process for the production of saturated cyclic dicarboxylic anhydrides by catalytic hydrogenation of the corresponding olefinically unsaturated carboxylic anhydrides.

It is known to hydrogenate maleic anhydride in the gas phase or in the liquid phase with molecular hydrogen using metallic nickel and/or copper as catalyst to form succinic anhydride. Considerable amounts of undesired byproducts, such as butyrolactone and succinic acid, are formed so that the process has not acquired any industrial importance. Since water is set free during the hydrogenation owing to the formation of lactones, the anhydride used is converted in equivalent amounts into the corresponding acid, the yield of desired anhydride thus being reduced. The activity and life of the catalyst are also impaired. Process difficulties are also great because the melting point of the free acids is usually higher than that of the corresponding anhydrides and stoppage of the apparatus may readily occur at a low hydrogenation temperature.

It is also known to hydrogenate maleic anhydride in alcohol as solvent by means of molecular hydrogen using platinum black as catalyst. Apart from the fact that platinum is very expensive, esters of succinic acid are formed by this method.

It is an object of this invention to provide a process for the production of saturated cyclic dicarboxylic anhydrides having four to ten carbon atoms by hydrogenation of the corresponding olefinically unsaturated anhydrides which gives excellent yields and in which practically no dicarboxylic acid is formed. It is another object of the invention to provide a process in which the cyclic anhydride is not hydrogenated to the corresponding lactone. A further object of the invention is to provide a process using an inexpensive catalyst which has a long life and is very simple to regenerate.

In accordance with this invention the said objects and advantages are achieved by hydrogenating with molecular hydrogen or a gas containing molecular hydrogen cyclic olefinically unsaturated dicarboxylic anhydrides having from four to ten carbon atoms, in the liquid phase and in the presence of a molybdate, tungstate, chromate and/or vanadate of copper, cobalt and/or nickel as catalyst.

The catalysts used in the process according to this invention are conventional hydrogenation catalysts. Surprisingly, when used in the hydrogenation of olefinically unsaturated dicarboxylic anhydrides, they produce superior results as compared with other conventional hydrogenation catalysts used in this reaction.

The catalyst may be used as a powder or in molded form. It may also be applied to inert carriers such as silicic acid, natural or synthetic silicates, clay or synthetic aluminum oxide. It may be advantageous to preheat the carrier to 500° to 1500° C., preferably 700° to 1400° C., in order to increase its mechanical strength.

If the catalytic substances are applied to carrier materials, it is advantageous to develop the catalyst on the carrier. This can be achieved, for example, by soaking the carrier with a solution containing copper, nickel and/or cobalt ions and, simultaneously or successively, and with a solution containing molybdate, tungstate, chromate, and/or vanadate ions. Suitable solutions containing copper, nickel and cobalt ions include solutions of ammonium double compounds, such as ammonium hydroxides (e.g. $[Cu(NH_3)_4](OH)_2$) or solutions of salts of the said metals, such as chlorides, nitrates, formates and acetates. The molybdate, tungstate, chromate and/or vanadate ions are preferably supplied as ammonium salt solutions. The impregnated carrier is then calcined at a temperature above 300° C., preferably at 300° to 600° C. If the various solutions are applied successively it is advantageous to calcine the carrier after every impregnation. By the calcination, the above-mentioned metal compounds, i.e. the active substances, are formed on the carrier. The catalysts thus prepared may be pretreated in a reducing atmosphere, for example with hydrogen, water gas or synthesis gas, preferably at 200° to 400° C.

As a rule the supported catalyst contains one or more of the said metal compounds in an amount of 2 to 25% by weight, preferably 5 to 20% by weight with reference to the total weight, the balance being carrier material.

Within the range defined above, the composition of the active substance is not critical. For example nickel may be used in the form of the molybdate, tungstate and/or chromate and/or vanadate. It is also possible however to use cobalt, nickel and/or copper molybdate.

The process may be carried out in the presence or absence of solvents that are inert under the reaction conditions. The solvents may be ethers, such as glycol ether; cyclic hydrocarbon, such as toluene, cyclohexane or xylene; esters, such as ethyl acetate or propionic acid esters; or cyclic esters, such as butyrolactone or dimethylsulfoxide. Dioxane is preferred. It is advantageous to use such an amount of solvent that the cyclic anhydride to be hydrogenated is completely dissolved in the solvent. The amount of solvent used is different in each case. It depends on the solvent power for the anhydrides in question at the working temperature used.

By means of the said catalysts it is possible to convert olefinically unsaturated cyclic carboxylic anhydrides having four to ten carbon atoms, such as maleic anhydride and its alkyl-substituted derivatives, such as citraconic anhydride, itaconic anhydride or tetrahydrophthalic anhydride, into the corresponding saturated cyclic carboxylic anhydrides.

The process may be carried out batchwise or continuously.

It is advantageous to work continuously in the liquid phase by the trickling method, the initial material being passed together with hydrogen quickly over the stationary catalyst. The colorless reaction liquid drawn off at the bottom of the reaction chamber may be further used without purification or, if for special reasons it appears to be advantageous, it may be purified by distillation.

It is also possible however to suspend the catalyst in the substance to be hydrogenated and pass it together with the hydrogen or hydrogen-containing gas through the reaction chamber.

Suitable reaction temperatures lie between 0° and 250° C. It is advantageous to work at temperatures between 20° and 170° C.

The reaction pressure may be chosen between atmospheric pressure and 300 atm. It is advantageous to work at hydrogen pressures between 10 and 250 atm.

By the use of the catalysts according to this invention, a practically 100% conversion to hydrogenated anhydride is possible, whereas with the usual catalysts considerable side reactions, for example formation of lactones and acids, take place.

The life of the catalysts described is many months. They may easily be regenerated by heating with hydrogen or by oxidation with air followed by a short hydrogen treatment.

The saturated cyclic dicarboxylic anhydrides are known to be useful in the preparation of plasticizers or polyesters.

The invention will be further illustrated by the following examples in which parts are by weight unless otherwise stated. Parts by weight bear the same relation to parts by volume as the gram to the liter.

*Example 1*

800 parts of shaped silicic acid which has been pretreated by heating to 800° to 1300° C. is impregnated with an aqueous strongly ammoniacal solution of 87.5 parts of freshly precipitated copper hydroxide and 161 parts of molybdic acid, until the whole of the solution has been absorbed by the carrier. The catalyst is then heated to 240° to 250° C.; steam and ammonia escape and copper molybdate is formed.

The catalyst thus prepared is charged to a vertical pressure vessel and treated at 230° to 250° C. with hydrogen for six to eight hours.

300 parts of a solution of 135 parts of maleic anhydride in 165 parts of dioxane is passed per hour over this catalyst at a feed temperature of 20° C. at a hydrogen pressure of 200 atmospheres at a speed of flow of 300 liters of hydrogen per hour, the temperature in the reaction vessel rising to 120° to 160° C. when the heat insulation is good. The reaction mixture leaving the reactor chamber is cooled to 60° to 70° C., then separated from excess hydrogen and the solvent distilled off. The crude product obtained has a melting point of 115° to 118° C.

137.4 parts of succinic anhydride is obtained from 135 parts of maleic anhydride, equivalent to 100% of the theory.

*Example 2*

260 parts of a 45% solution of maleic anhydride in dioxane is passed, as described in Example 1, over 800 parts of pelleted silicic acid provided with 10% by weight of copper chromate at a reaction temperature of 20° C. rising to 150° C. at a pressure of 100 atmospheres of hydrogen at a gas velocity of 360 liters per hour, corrected to normal pressure. After the reaction mixture has been worked up as in Example 1, 117.5 parts of succinic anhydride is obtained, i.e. 98.5% of the theory. 0.6% by weight of butyrolactone and 0.6% by weight of succinic acid are also formed.

The same yield is obtained by using a catalyst which has been prepared analogously to Example 1 and which contains 10% by weight of copper vanadate instead of the copper chromate catalyst.

*Example 3*

300 parts of a 45% solution of maleic anhydride in dioxane is passed per hour at an initial temperature of 20° C. over 800 parts of a catalyst consisting of pelleted silicic acid with 19% by weight of cobalt molybdate at a hydrogen pressure of 200 atmospheres at a gas velocity of 400 parts by volume per hour, corrected to normal pressure. The temperature rises to 145° C. during the reaction.

The solvent is separated from the reaction mixture and then 117.2 parts of succinic anhydride is recovered, being 100% of the theoretical yield.

*Example 4*

120 parts of molten maleic anhydride is passed per hour at a feed temperature of 75° C. over 800 parts of the catalyst described in Example 1, together with hydrogen at a pressure of 150 atmospheres at a hydrogen velocity of 250 parts by volume per hour, corrected to normal pressure. The reaction temperature rises to 160° C. in the lower part of the reactor. The molten reaction mixture discharged from the reactor is worked up in the usual way after the hydrogen has been separated.

121.5 parts of succinic anhydride (99.2% of the theory) is obtained from 120 parts of maleic anhydride.

*Example 5*

800 parts of shaped silicic acid which has been pretreated by heating at 800° to 1300° C. is impregnated with an aqueous strongly ammoniacal solution of 83 parts of freshly precipitated nickel hydroxide and 161 parts of molybdic acid until the whole of the solution has been absorbed by the carrier. The catalyst is then heated to 240° to 250° C.; steam and ammonia escape and nickel molybdate is formed.

The catalyst thus prepared is charged to a vertical pressure vessel and treated with hydrogen at 300° to 350° C. for six to eight hours.

300 parts of a solution of 135 parts of maleic anhydride in 165 parts of dioxane is passed over this catalyst per hour at a feed temperature of 20° C. at a hydrogen pressure of 100 atmospheres with a speed of flow of 400 liters of hydrogen per hour. The temperature in the reactor rises to 95° to 120° C. if the heat insulation is good. The reaction mixture leaving the reactor is cooled to 60° to 70° C., freed from excess hydrogen and the solvent distilled off. The crude product thus obtained has a melting point of 114.5° to 116.5° C.

135.8 parts of succinic anhydride (98.5% of the theory) is obtained from 135 parts of maleic anhydride.

*Example 6*

450 parts of a 20% by weight solution of tetrahydrophthalic anhydride in dioxane, which has been obtained by condensation of butadiene and maleic anhydride is allowed to trickle per hour over the catalyst described in Example 5 at a reaction temperature of 20° to 30° C., at a hydrogen pressure of about 80 atmospheres and at a gas velocity of 1000 liters of hydrogen per hour, corrected to normal pressure. By working up the reaction mixture in the way described in Example 5, 90.9 parts per hour of hexahydrophthalic anhydride is obtained. This is a yield of 99.5% of the theory.

*Example 7*

At about 25° to 40° C. and a hydrogen pressure of about 120 atmospheres, 400 parts of a 20% solution of tetrahydrophthalic anhydride in dioxane is allowed to trickle per hour over a catalyst which contains 16% by weight of nickel and copper tungstate in the ratio of Ni:Cu of 75:25 by weight and which has been applied to pelleted silicic acid which has been heated to about 1000° C. The gas velocity is 700 liters/hour. By working up as described in Example 6, 80.8 parts of hexahydrophthalic anhydride per hour is obtained. This is a yield of 99.5% of the theory.

I claim:

1. A process for the production of cyclic saturated dicarboxylic anhydrides having from 4 to 10 carbon atoms which comprises reacting cyclic olefinically unsaturated dicarboxylic anhydrides having from 4 to 10 carbon atoms with molecular hydrogen in the liquid phase and in the presence of a hydrogenation catalyst selected from the group consisting of copper molybdate, cobalt molybdate, nickel molybdate, copper tungstate, cobalt tungstate, nickel tungstate, copper chromate, cobalt chromate, nickel chromate, copper vanadate, cobalt vanadate, nickel vanadate and mixtures thereof.

2. A process as claimed in claim 1 carried out at a temperature between 0 and 250° C.

3. A process as claimed in claim 1 carried out at a temperature between 20 and 170° C.

4. A process as claimed in claim 1 carried out at a hydrogen pressure between 10 and 250 atmospheres.

No references cited.